United States Patent Office.

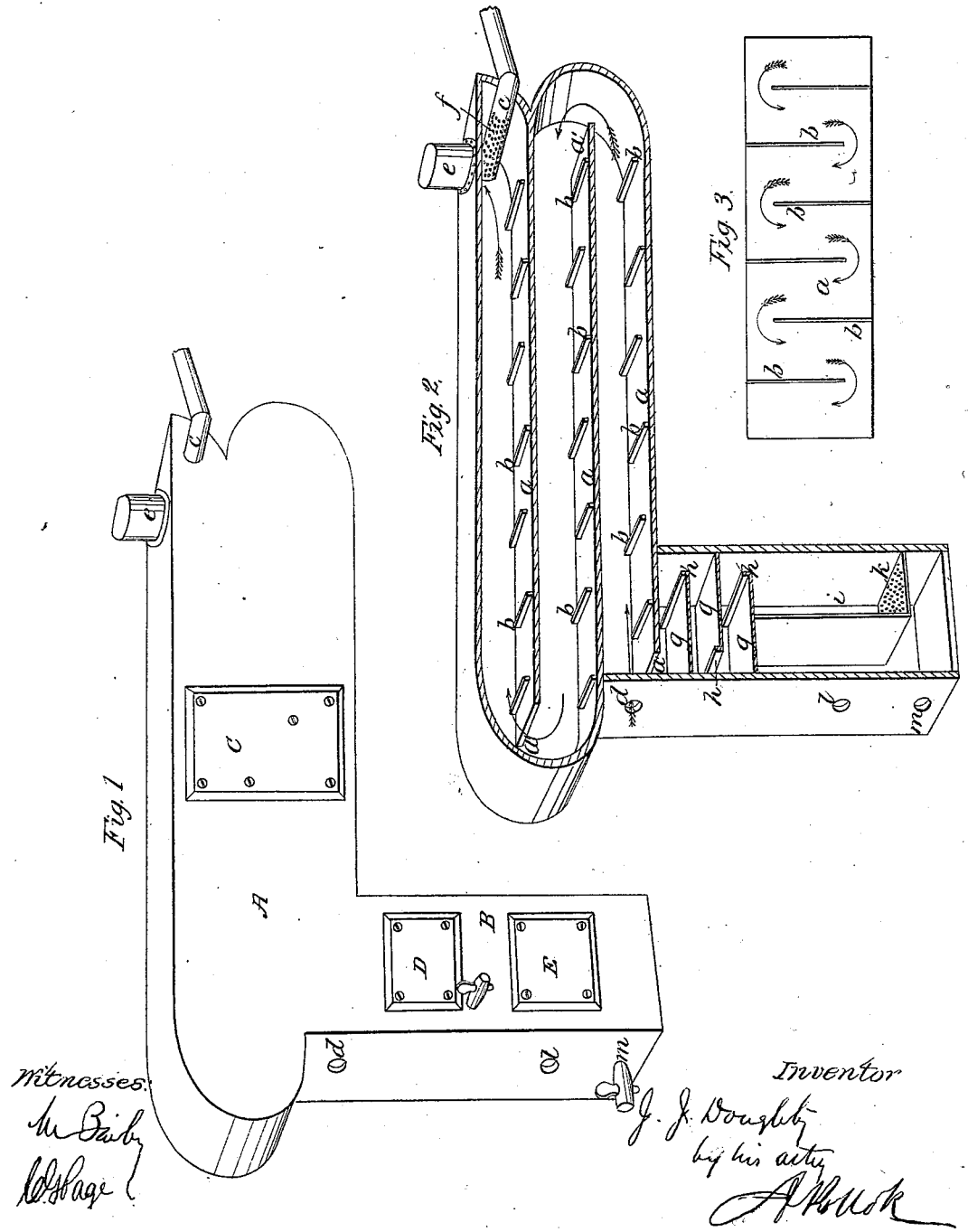

J. J. DOUGHTY, OF LAKE CITY, MINNESOTA.

Letters Patent No. 82,609, dated September 29, 1868.

IMPROVEMENT IN HEATER AND FILTER FOR BOILERS.

*The Schedule referred to in these Letters Patent and making part of the same.*

TO WHOM IT MAY CONCERN:

Be it known that I, J. J. DOUGHTY, of Lake City, in the county of Wabusha, and State of Minnesota, have invented certain new and useful Improvements in Apparatus for Heating, Filtering, and Extracting Lime from Water; and I hereby declare the following to be a full, clear, and exact description of the same, reference being had to the accompanying drawings, in which—

Figure 1 is a perspective view of an apparatus constructed according to my invention.

Figure 2 is a like view of the same, with the side covering removed so as to show the internal construction and arrangement of the apparatus.

Figure 3 is a plan view of one of the shelves of the heater, detached.

My invention relates to the heating and purifying of water used in steam-boilers or generators, and it consists of an apparatus, constructed as hereinafter described, in which the water is heated by means of steam, preferably the exhaust steam from the steam-engine, and is thoroughly filtered and purified before passing to the steam-generating apparatus. The presence of impurities, especially lime, in water used for making steam, is the occasion of the frequent incrustation or scale formed in boilers; and it is one of the objects I have in view to precipitate the lime, or to extract it from the water, so as to keep the boiler free as far as possible from scale and foul matter.

To accomplish this result, I discharge the feed-water into a heater provided with a series of longitudinal beds or shelves, over which the water flows in sheets; and into this heater I introduce steam, which, coming in contact with the water, heats it, and precipitates the lime or other impurities contained in it. The water flows from these shelves to another series of shelves, upon which the lime and other impurities are deposited, whence it passes into a filter, which separates it effectually from any remaining foreign matter, and brings it to a fit state to be used in the steam-boiler.

By this operation, the steam which is used to heat and partially purify the water, is itself partially or nearly wholly condensed, so that the apparatus not only acts as a water-heater and filter, but also serves as a steam-condenser.

To enable those skilled in the art to understand and use my invention, I will now proceed to describe the manner in which the same is or may be carried into effect, by reference to the accompanying drawings.

The heater, or that portion of the apparatus in which the water is subjected to the action of the heating-agent, is marked A. It is provided with a series of horizontal shelves, $a$, each of which carries a number of cross or partition-pieces, $b$ $b$, arranged as shown in fig. 3, so as to leave an opening for the water alternately toward the one side and the other of the heater, thus causing the water, as it flows over the shelves, to pursue a serpentine or winding course, as indicated by arrows in the figure referred to. The top shelf $a$ is firmly united with the case or shell of the heater, at the end where the water enters, and a space, $a'$, is left between its other end and the corresponding end of the heater, through which the water, after flowing the whole length of the shelf, falls upon the one next below.

The openings $a'$, through which the water falls from each shelf upon the one next below, are made alternately at one end and the other of the heater, thus causing the water to flow in a thin sheet and in a serpentine path over the surface of all the horizontal shelves.

The water is fed from any suitable reservoir, or by means of a pump or other forcing-apparatus, through the pipe $c$, which is introduced in the upper part, and at one end of the apparatus, as shown in fig. 2. The steam or other heating-agent enters through the opening $d$, immediately above the lowest shelf $a$, and following the course indicated by the arrows in fig. 2, so as to pass over the surface of and come in contact with the water on each of the shelves $a$, finally passes out, that is, so much as has not been condensed by the water from the exhaust $e$ in the top of the heater. I prefer to employ for this purpose the exhaust steam of the engine in connection with which this apparatus is employed.

That portion of the water-pipe $c$ within the heater, I find it desirable to provide with a series of perforations or fine holes, $f$, through which the water will be forced in a fine spray or mist, which comes in direct contact with the exhaust steam, and condenses a larger amount of it.

That end of the horizontal heater at which the opening $a'$ of the lowest shelf $a$ is situated, is connected with a perpendicular filtering-apparatus, B, consisting of a series of lime-depositing shelves, $g$, opening alternately towards one side and the other of the case B, and provided at their open ends with ledges $h$. The lowest shelf, $g$, rests upon and opens into a filtering-box, $i$, the bottom of which is perforated, so as to form a strainer, $k$.

The bottom of the box $i$ is some little distance above the base of the exterior case B, and in the side of the latter are formed two orifices, the upper one, $l$, intended for the insertion of the pipe for conducting the heated and purified water to the boiler, the lower one, $m$, (provided with a stop-cock) for drawing off the sediment which may escape from the filtering-box and gather on the bottom of the case B.

The water, which has been thoroughly heated during its passage over the horizontal heating-shelves, falls from the lower shelf $a$ upon the shelf $g$. The water gathers on this shelf to the depth of the ledge or flange $h$, and as the lime and other impurities in the water, disengaged or precipitated by the heat, fall to the bottom, the ledge $h$ prevents them in a measure from passing down with the water which flows from one shelf, $g$, to another, and over the several ledges $h$, until it falls into the filtering-box $i$, which, if desired, may be filled with hay, straw, or other material capable of dividing the water and taking up the foreign substances in it.

The water now drains through the strainer $k$, and gathers in the receptacle B, as high as the eduction-opening $l$, whence it is drawn off to the boiler.

It will thus be seen that, by means of an apparatus constructed as above described, I am enabled to thoroughly heat and purify the water before it leaves the apparatus, and also to condense to a great extent the steam employed as the heating-agent.

In order to obtain access to the apparatus when it becomes necessary to clean or repair it, I form in its side three doors, C D E, through the first of which access may be had, when desired, to the horizontal heater A and its shelves; the second is to be used when the lime-depositing shelves $g$ require cleaning; and the third is intended to facilitate the operation of cleaning the filter $l$, and bottom of the receptacle B.

Having now described my invention, and the manner in which the same is or may be carried into effect, I would state that I do not claim the arrangement of devices shown in the patents of E. R. Stillwell, dated October 4, 1864, and Crighton, Wills & Rostetter, dated June 11, 1867, and in the rejected applications of Faries & Simex, March 15, 1866, and William Bourdon, February 15, 1856; but

What I claim, and desire to secure by Letters Patent, is—

The arrangement of the horizontal shelves, with their partition-pieces, the steam and water admission and discharge-pipes, the lime-depositing shelves $g$, the filter $l$, and the doors formed in the heater and filter-case A B, through which access may be had to said shelves and filter, substantially as herein shown and described.

In testimony whereof, I have signed my name to this specification before two subscribing witnesses.

J. J. DOUGHTY.

Witnesses:
WM. J. BURNS,
W. A. DOE.